United States Patent
Nakano (10) Patent No.: US 12,307,692 B2
(45) Date of Patent: May 20, 2025

(54) PROJECTION TRANSFORMATION PARAMETER ESTIMATION DEVICE, PROJECTION TRANSFORMATION PARAMETER ESTIMATION METHOD, AND COMPUTER READABLE MEDIUM STORING PROGRAM THEREOF

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 17/797,463

(22) PCT Filed: Feb. 17, 2020

(86) PCT No.: PCT/JP2020/005945
§ 371 (c)(1),
(2) Date: Aug. 4, 2022

(87) PCT Pub. No.: WO2021/166012
PCT Pub. Date: Aug. 26, 2021

(65) Prior Publication Data
US 2023/0093694 A1    Mar. 23, 2023

(51) Int. Cl.
G06T 7/33        (2017.01)
G06T 3/14        (2024.01)
G06T 7/64        (2017.01)

(52) U.S. Cl.
CPC ............... *G06T 7/337* (2017.01); *G06T 3/14* (2024.01); *G06T 7/64* (2017.01); *G06T 2207/10028* (2013.01)

(58) Field of Classification Search
CPC ... G06T 2207/10028; G06T 3/00; G06T 3/14; G06T 7/337; G06T 7/64
See application file for complete search history.

(56) References Cited

U.S. PATENT DOCUMENTS

2002/0114536 A1*  8/2002  Xiong .................... G06V 10/24
                                              382/284
2004/0184010 A1*  9/2004  Raskar ................... G06T 3/153
                                              353/94
(Continued)

FOREIGN PATENT DOCUMENTS

JP        2013-246779 A      12/2013

OTHER PUBLICATIONS

Shankar R. Rao et al., "Robust Algebraic Segmentation of Mixed Rigid-Body and Planar Motions from Two Views," Jan. 7, 2010, Int J Comput Vis (2010) 88, pp. 425-438.*

(Continued)

*Primary Examiner* — Omar S Ismail (57) ABSTRACT

A projection transformation parameter for guaranteeing a deformation to a convex quadrilateral can be calculated even when one or more of correspondence points are errors. A projection transformation parameter estimation device according to an embodiment includes a correspondence point detection unit (1) configured to detect information about a correspondence between two pieces of input data, a quadratic surface calculation unit (2) configured to fit a quadratic surface to the information about the correspondence for one or both of the two pieces of the input data, and a projection transformation matrix calculation unit (3) configured to calculate a projection transformation parameter between the two pieces of the input data by using the information about the correspondence with a constraint condition specifying that a property of the quadratic surface is maintained even after projection transformation.

9 Claims, 4 Drawing Sheets

(56) References Cited

U.S. PATENT DOCUMENTS

| | | | | |
|---|---|---|---|---|
| 2004/0184011 | A1* | 9/2004 | Raskar | G03B 21/26 353/94 |
| 2009/0245692 | A1* | 10/2009 | Okutomi | G06T 7/32 382/294 |
| 2011/0216051 | A1* | 9/2011 | Ishiyama | G03B 21/00 345/207 |
| 2013/0113975 | A1* | 5/2013 | Gabris | G03B 17/54 353/121 |
| 2013/0141580 | A1* | 6/2013 | Stein | B60W 40/076 348/148 |
| 2013/0286012 | A1* | 10/2013 | Medioni | G06T 7/00 345/420 |
| 2015/0086080 | A1* | 3/2015 | Stein | H04N 7/183 382/104 |
| 2016/0253824 | A1* | 9/2016 | Yu | H04N 23/663 348/46 |

OTHER PUBLICATIONS

Paulo Fabiano Urnau Gotardo et al., "Range Image Segmentation Into Planar and Quadric Surfaces Using an Improved Robust Estimator and Genetic Algorithm," Jan. 23, 2004, IEEE Transactions on Systems, Man, and Cybernetics-Part B: Cybernetics, vol. 34, No. 6, Dec. 2004, pp. 2303-2311.*

Dror Aiger, "4-Points Congruent Sets for Robust Pairwise Surface Registration," Aug. 1, 2008, SIGGRAPH '08: ACM SIGGRAPH 2008 papers Article No. 85, pp. 85:1-85:9.*

Pierre-Alain Langlois et al., "Surface Reconstruction from 3D Line Segments," Oct. 31, 2019, 2019 International Conference on 3D Vision (3DV), pp. 553-560.*

Toby Collins, "Planar Structure-from-Motion with Affine Camera Models: Closed-Form Solutions, Ambiguities and Degeneracy Analysis," May 12, 2017, IEEE Transactions on Pattern Analysis and Machine Intelligence, vol. 39, No. 6, Jun. 2017, pp. 1237-1247.*

Ricardo Fabbri, "Multiview Differential Geometry in Application to Computer Vision," May 2011, Dissertation PhD Thesis, Division of Engineering at Brown University, 2011, pp. 51-61,81-86 and 118-122.*

Johann Prankl et al., "Interactive object modelling based on piecewise planar surface patches," Computer Vision and Image Understanding 117 (2013), pp. 718-725.*

Srikumar Ramalingam et al., "A Theory of Minimal 3D Point to 3D Plane Registration and Its Generalization," Sep. 27, 2012, Int J Comput Vis (2013) 102, pp. 73-87.*

Bogumil Bartczak et al., "Extraction of 3D freeform surfaces as visual landmarks for real-time tracking," Oct. 10, 2007, J Real-Time Image Proc (2007) 2, pp. 81-92.*

Jun Wang et al., "Quadratic curve and surface fitting via squared distance minimization," Sep. 24, 2011, Computers & Graphics, vol. 35, Issue 6, Dec. 2011, pp. 1035-1044.*

International Search Report for PCT Application No. PCT/JP2020/005945, mailed on May 19, 2020.

R. Hartley and A. Zisserman, "Multiple View Geometry in Computer Vision, 2nd edition," p. 91, Cambridge university press, 2004.

R. Hartley and A. Zisserman, "Multiple View Geometry in Computer Vision, 2nd edition," p. 123-124, Cambridge university press, 2004.

Marquez-Neila, Pablo, et al. "Speeding-up homography estimation in mobile devices", Journal of Real-Time Image Processing 11.1 (2016), pp. 141-154.

* cited by examiner

PROJECTION TRANSFORMATION PARAMETER ESTIMATION DEVICE, PROJECTION TRANSFORMATION PARAMETER ESTIMATION METHOD, AND COMPUTER READABLE MEDIUM STORING PROGRAM THEREOF

This application is a National Stage Entry of PCT/JP2020/005945 filed on Feb. 17, 2020, the contents of all of which are incorporated herein by reference, in their entirety.

TECHNICAL FIELD

The present disclosure relates to a projection transformation parameter estimation device, a projection transformation parameter estimation method, and a computer readable medium storing a program thereof.

BACKGROUND ART

Planar projection transformation is known as an expression representing a geometric relationship between a plurality of images obtained by capturing a plane. The use of planar projection transformation parameters enables various applications such as creation of a panorama image by connecting images, reconstruction of a front image from an inclined plane, calibration of internal parameters of a camera, and localization of a robot. It is widely known that the planar projection transformation parameters can be calculated by using a minimum of four pairs of image correspondence points (Non Patent Literature 1).

As a method for acquiring image correspondence points, commonly a method for detecting feature points from an image by using SIFT (Scale Invariant Feature Transform) or the like and matching feature amounts is used. However, if the correspondence points are detected based on the feature amount matching, an erroneous correspondence point may be included. Here, the erroneous correspondence point is a correspondence point where two-dimensional coordinates do not match (an error is larger than a threshold) those of a correspondence point that has been subjected to planar projection transformation. RANSAC (RANdom SAmple Consensus) is widely known as a method for calculating a correct planar projection transformation parameter by eliminating erroneous correspondence points (Non Patent Literature 2).

However, the method described in the Non Patent Literature 2 may not be sufficient to eliminate all the erroneous correspondence points. That is, the correspondence point at which the projection transformation is established in terms of a mathematical equation cannot be removed. When an erroneous correspondence point is included as described above, a planar projection transformation that causes a transformation from a convex quadrilateral to a non-convex quadrilateral that cannot actually occur, such as a projection to infinity or a transformation to a twisted square, may be calculated.

Non Patent Literature 3 describes one method of preventing projective transformations that cannot occur physically. A normal direction of a plane is invariant before and after the projection transformation. A normal of the plane can be calculated from three correspondence points. In this method, three pairs of correspondence points for which a projection transformation can be calculated are randomly selected from among four pairs thereof, and the directions of the normals formed by the three correspondence points are verified, and if they are the same direction, the correspondences are regarded as being correct correspondences whereas if they are different directions, the correspondences are regarded as being wrong correspondences and discarded.

However, in the method described in the Non Patent Literature 3, the some directions of the normals may match with each other depending on the combination of the three pairs of correspondence points, and a transformation which cannot physically occur may not be detected. Even if all four combinations, which are selected from among the three pairs of correspondence points, there can still be erroneous correspondence points for which a projective transformation is established in terms of a mathematical equation. That is, the erroneous correspondence points cannot be completely removed, and thus it is not possible to eliminate a possibility that a projection transformation parameter finally calculated is a deformation to a non-convex quadrilateral.

CITATION LIST

Non Patent Literature

Non Patent Literature 1: R. Hartley and A. Zisserman, "Multiple View Geometry in Computer Vision, 2nd edition," p. 91, Cambridge university press, 2004.
Non Patent Literature 2: R. Hartley and A. Zisserman, "Multiple View Geometry in Computer Vision, 2nd edition," p. 123-124, Cambridge university press, 2004.
Non Patent Literature 3: Marquez-Neila, Pablo, et al. "Speeding-up homography estimation in mobile devices." Journal of Real-Time Image Processing 11.1 (2016), 141-154.

SUMMARY OF INVENTION

Technical Problem

As described above, there has been a problem that a projection transformation parameter to a non-convex quadrilateral is calculated when one or more of the correspondence points are errors.

The present disclosure has been made in light of the above problem and an object thereof is to provide a projection transformation parameter estimation device, a projection transformation parameter estimation method, and a computer readable medium storing a program thereof capable of calculating a projection transformation parameter for guaranteeing a deformation to a convex quadrilateral even when one or more of correspondence points are errors.

Solution to Problem

In an example aspect of the present disclosure, a projection transformation parameter estimation device includes: a correspondence information detection unit configured to detect information about a correspondence between two pieces of input data; a quadratic surface calculation unit configured to fit a quadratic surface to the information about the correspondence for one or both of the two pieces of the input data; and a projection transformation matrix calculation unit configured to calculate a projection transformation parameter between the two pieces of the input data by using the information about the correspondence with a constraint condition specifying that a property of the quadratic surface is maintained even after projection transformation.

In another example aspect of the present disclosure, a projection transformation parameter estimation method includes: detecting information about a correspondence between two pieces of input data; fitting a quadratic surface to the information about the correspondence for one or both of the two pieces of the input data; and calculating a projection transformation parameter between the two pieces of the input data by using the information about the correspondence with a constraint condition specifying that a property of the quadratic surface is maintained even after projection transformation.

In another example aspect of the present disclosure, a computer readable medium stores a program for causing a computer to execute processing of: detecting information about a correspondence between two pieces of input data; fitting a quadratic surface to the information about the correspondence for one or both of the two pieces of the input data; and calculating a projection transformation parameter between the two pieces of the input data by using the information about the correspondence with a constraint condition specifying that a property of the quadratic surface is maintained even after projection transformation.

Advantageous Effects of Invention

According to the present disclosure, it is possible to provide a projection transformation parameter estimation device, a projection transformation parameter estimation method, and a computer readable medium storing a program thereof capable of calculating a projection transformation parameter for guaranteeing a deformation to a convex quadrilateral even when one or more of correspondence points are errors.

EXAMPLE EMBODIMENT

Example embodiments of the present disclosure will now be described with reference to the drawings. For clarity of explanation, the following description and drawings have been omitted and simplified as appropriate.

Example Embodiment

Figure 1:
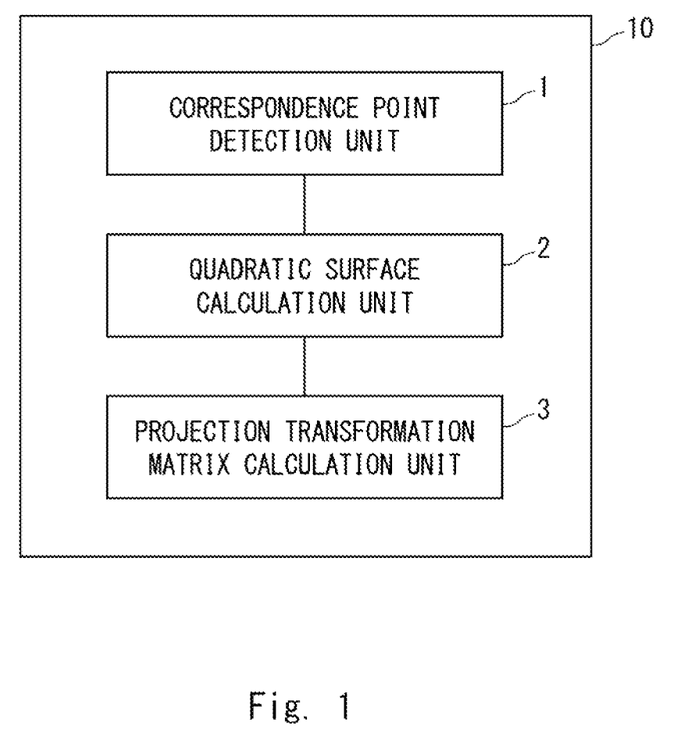
FIG. 1 is a block diagram showing an example of a configuration of a projection transformation parameter estimation device according to an example embodiment.

FIG. 1 is a functional block diagram showing an example of a configuration of a projection transformation parameter estimation device according to the example embodiment. As shown in FIG. 1, a projection transformation parameter estimation device 10 according to the example embodiment includes a correspondence point detection unit 1, a quadratic surface calculation unit 2, and a projection transformation matrix calculation unit 3. Here, an example in which the correspondence point detection unit for detecting correspondence points as information about a correspondence between two pieces of input data (such information is hereinafter referred to as correspondence information) is shown.

Two pieces of input data (data 1 and data 2) for which a projection transformation matrix is to be calculated are input to the correspondence point detection unit 1. When the data 1 and the data 2 are input, the correspondence point detection unit 1 detects feature points from each piece of the data, and outputs, as the correspondence points, the feature points having feature amounts different from each other by a small amount.

The data 1 and the data 2 may be, for example, two images obtained by capturing a certain plane from different angles, or may be point clouds obtained by extracting parts of a certain three-dimensional object. As the method for calculating the feature points and the feature amounts, for example, existing techniques such as SIFT (Scale-Invariant Feature Transform) for images, SHOT (Signature of Histograms of Orientations) and PPF (Point Pair Feature) for point clouds may be used.

In regard to the method for calculating the correspondence points, the correspondence points may be further narrowed down by using the method described in the Non Patent Literature 2 or the Non Patent Literature 3 after the feature points having feature amounts different from each other by a small amount are selected. The correspondence point detection unit 1 can detect a total of four or more pairs of correspondence points represented by two-dimensional coordinates in an image.

When a pair of the correspondence points of the data 1 and the data 2 is input, the quadratic surface calculation unit 2 calculates a quadratic surface surrounding either one or both of the correspondence points of the data 1 and the data 2. In the case of image feature points, the quadratic surface calculation unit 2 calculates, for example, an ellipse or a hyperbola on the same plane as that of the correspondence points of the data 1. In the case of point cloud feature points, the quadratic surface calculation unit 2 calculates, for example, an ellipsoid or a hyperboloid surrounding the correspondence points of the data 1. Here, the "quadratic surface" is a generalized expression of a conic curve such as an ellipse or a hyperbola, and when simply expressed as a quadratic surface, it is assumed that not only a three-dimensional quadratic surface but also a conic curve are included.

When a pair of correspondence points and a quadratic surface are input, the projection transformation matrix calculation unit 3 calculates a projection transformation matrix under a constraint condition specifying that a property (type) of the quadratic surface is maintained even after the transformation. For example, if the quadratic surface fitted to the data 1 is an ellipse, the constraint condition may specify that the quadratic surface is an ellipse even after the transformation.

Figure 2:
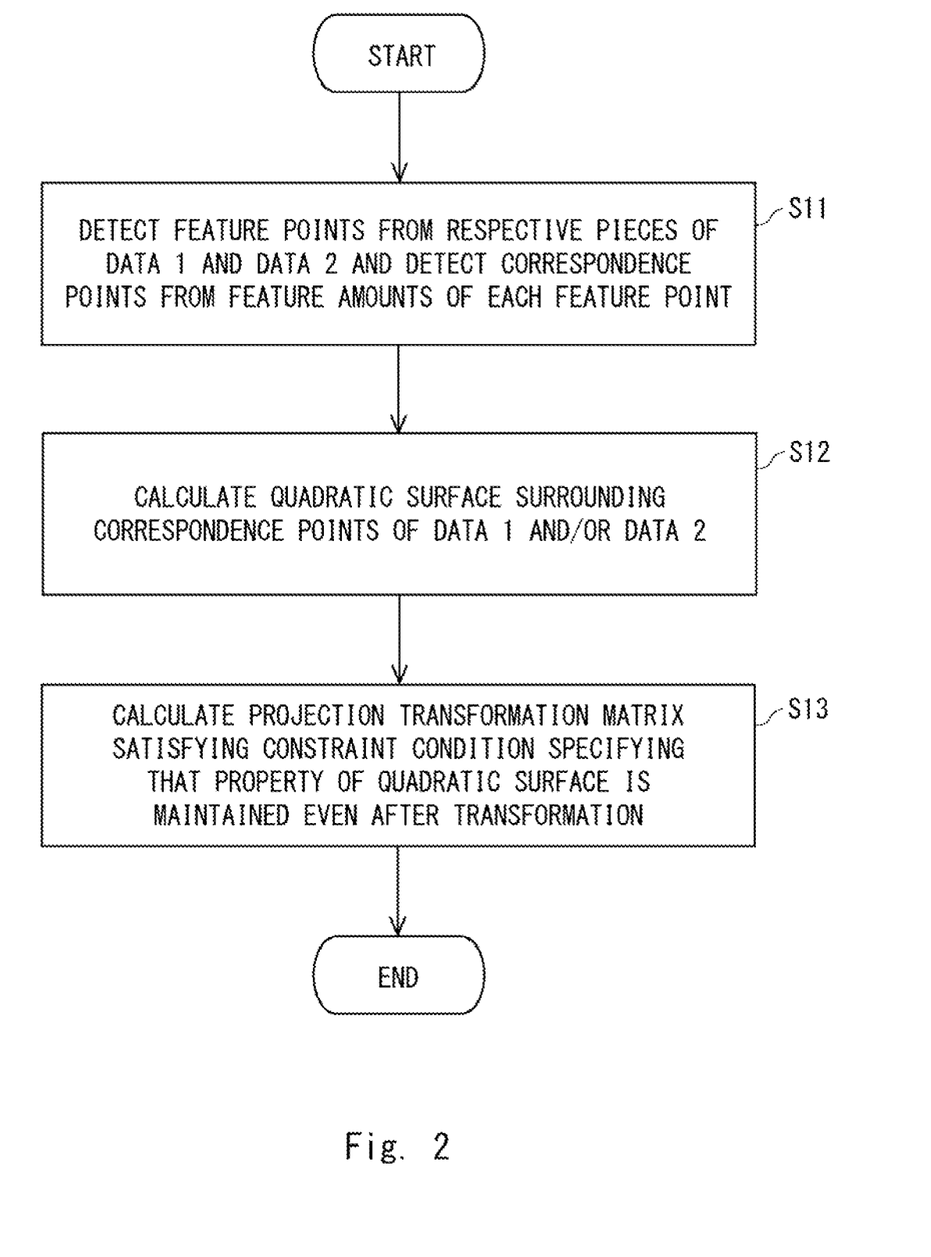
FIG. 2 is a flowchart showing an example of an operation of the projection transformation parameter estimation device according to the example embodiment.

Next, an operation of the projection transformation parameter estimation device according to the example embodiment will be described with reference to FIG. 2. FIG. 2 is a flowchart showing an example of the operation of the projection transformation parameter estimation device. In this example embodiment, a projection transformation method is implemented by operating the projection transformation parameter estimation device. Therefore, the description of the projection transformation parameter estimation method in this example embodiment is substituted for the following description of the operation of the projection transformation parameter estimation device.

First, when the data 1 and the data 2 are input to the correspondence point detection unit 1, the feature points are detected from the respective data pieces, and the feature points having feature amounts different from each other by a small amount are output as correspondence points (Step S11).

Next, when a pair of the correspondence points of the data 1 and the data 2 output from the correspondence point detection unit 1 is input to the quadratic surface calculation unit 2, a quadratic surface surrounding the correspondence points of the data 1 and/or the data 2 is calculated (Step S12).

Lastly, when the pair of correspondence points and the quadratic surface are input to the projection transformation matrix calculation unit 3, a projection transformation matrix satisfying the constraint condition specifying that the property (type) of the quadratic surface is maintained even after the transformation is calculated (Step S13).

Specific Example

Figure 3:
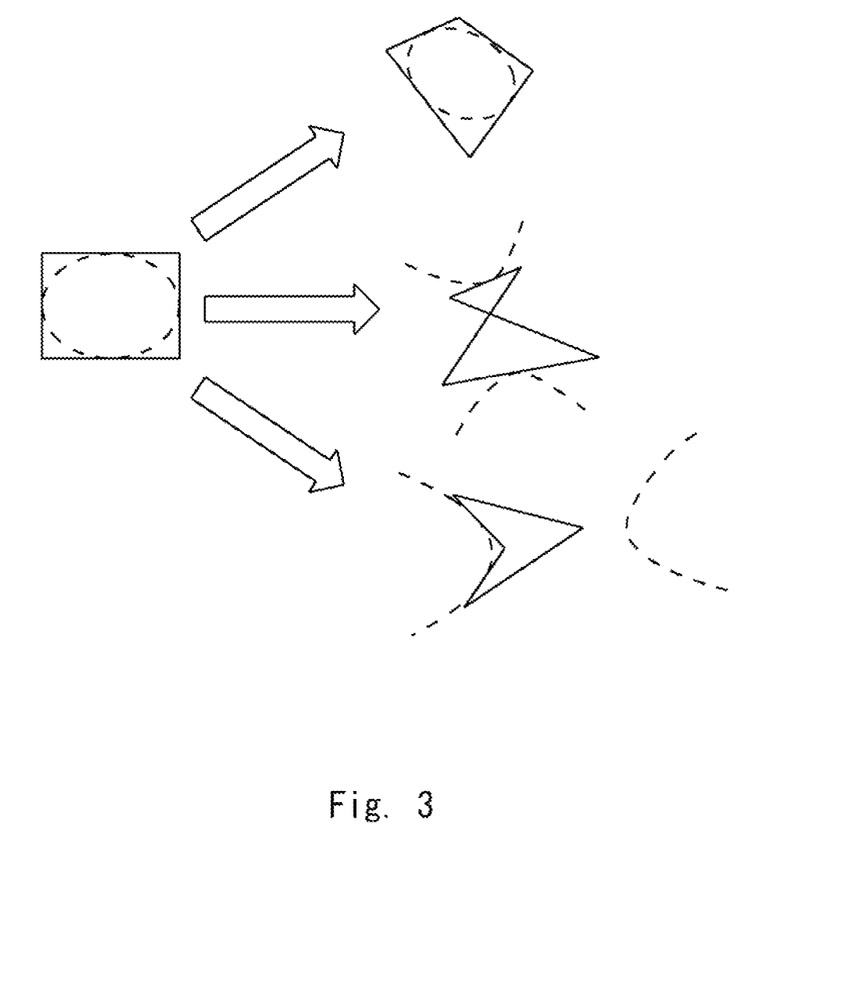
FIG. 3 is a diagram for explaining a specific example of projection transformation according to the projection transformation parameter calculated in the example embodiment.

A specific example of this example embodiment will be described with reference to FIG. 3. FIG. 3 is a diagram for explaining a specific example of projection transformation according to the projection transformation parameters calculated in the example embodiment. FIG. 3 shows projection transformation of a square on a plane viewed from different angles.

In the upper row of FIG. 3, correct correspondence points are obtained, and a rectangle surrounding the correspondence points is transformed into a convex quadrilateral. This is a realistic transformation that can occur. On the other hand, the middle and lower rows of FIG. 3 each include an erroneous correspondence point, so that they are transformed into non-convex quadrilaterals. In this manner, it is physically impossible for a rectangle to be observed as a non-convex quadrilateral when viewed from a different angle.

On the left side of FIG. 3, a dotted line represents an ellipse inscribed in a square. This ellipse is an inscribed ellipse even after the projection transformation in the upper row on the right side of FIG. 3. However, in each of the middle and lower rows on the right side of FIG. 3, this ellipse is transformed into a hyperbola touching a non-convex quadrilateral. Thus, when the convex quadrilateral is transformed into a non-convex quadrilateral, an ellipse on the same plane as that of correspondence points is transformed into a hyperbola. Therefore, if the projection transformation is calculated so as to satisfy the constraint condition specifying that an ellipse is maintained as an ellipse even after the transformation, the transformation from a convex quadrilateral to a convex quadrilateral is guaranteed.

In the following description, the projection transformation parameters are also referred to as a projection transformation matrix as appropriate. Assuming that the image correspondence points on the plane before and after the transformation are m and m', respectively, and the projection transformation matrix is H, the projection transformation of m and m' is expressed by the following Equation (1).

[Equation 1]

$$m' \sim Hm \quad \text{Equation (1)}$$

In this equation, $\sim$ represents that the left and right sides are equal to a constant multiple, m and m' are 3×1 homogeneous coordinate systems, and H is a 3×3 matrix.

Non Patent Literature 1 states that when four or more pairs of correspondence points are given, the optimization problem expressed by the following Equation (2) can be solved in order to calculate H.

[Equation 2]

$$\min_h \sum \|m' \times Hm\|^2 = \|Mh\|^2 \quad \text{Equation (2)}$$

$$\text{s.t. } \|h\|^2 = 1$$

In this equation, h is a vector representation of H, and M is a coefficient matrix composed of m and m'.

Equation (2) is known to be reduced to linear least squares by using the Lagrangian undetermined multiplier method.

Next, an ellipse present on the same plane as that of the rectangle before the transformation and an ellipse after the projection transformation are expressed by the following Equation (3).

[Equation 3]

$$m^T C m = 0$$

$$m'^T C' m' = 0 \quad \text{Equation (3)}$$

In this equation, C and C' are 3×3 symmetric matrices.

From the Equation (1), an ellipse C' after the transformation is expressed by the following Equation (4).

[Equation 4]

$$m'^T C' m' = (m^T H^T)(H^{-T} C H^{-1}) = 0$$

$$C' = H^{-T} C H^{-1} \quad \text{Equation (4)}$$

If projection transformation (transformation from a convex quadrilateral to a convex quadrilateral) is physically possible, an ellipse is an ellipse before and after the projection transformation. On the other hand, as shown in the middle and bottom rows of FIG. 3, when a rectangle is transformed into a non-convex quadrilateral, the transformed ellipse becomes a hyperbola. In other words, the constraint condition specifying that the transformed C' is maintained as an ellipse may be satisfied.

In general, the necessary and sufficient condition for a conic curve C to become an ellipse is expressed by Equation (5).

[Equation 5]

$$4ac - b^2 > 0 \quad \text{Equation (5)}$$

where $$C = \begin{bmatrix} a & b/2 & d/2 \\ b/2 & c & e/2 \\ d/2 & e/2 & f \end{bmatrix}$$

When Equation (4) is substituted into Equation (5), the following Equation (6) is obtained.

[Equation 6]

$$4a'c' - b'^2 = \frac{h^T S h}{4 \det(H)^2} > 0 \quad \text{Equation (6)}$$

where $$C' = \begin{bmatrix} a' & b'/2 & d'/2 \\ b'/2 & c' & e'/2 \\ d'/2 & e'/2 & f' \end{bmatrix}$$

-continued $$S = \begin{bmatrix} 0_{6\times 6} & 0_{6\times 3} \\ & 4cf-e^2 & de-2bf & be-2cd \\ 0_{3\times 6} & de-2bf & 4af-d^2 & bd-2ae \\ & be-2cd & bd-2ae & 4ac-b^2 \end{bmatrix}$$

Since it is obvious that a denominator in Equation (6) is positive, the constraint condition specifies that a numerator is positive.

Equation (6) is invariant to a constant multiple of H, so it does not lose generality even if $h^T Sh=1$. In other words, the optimization problem expressed by the following Equation (7) can be solved for the projection transformation with the constraint condition specifying that an ellipse is an ellipse before and after the transformation.

[Equation 7]

$$\min_h \|Mh\|^2 \qquad \text{Equation (7)}$$

s.t. $h^T Sh = 1$

Equation (7) is reduced to the following generalized eigenvalue problem when the Lagrangian undetermined multiplier method is used.

[Equation 8]

$$M^T Mh = \lambda Sh \qquad \text{Equation (8)}$$

In this equation, $\lambda$ is an eigenvalue. As an eigenvector corresponding to the smallest non-negative eigenvalue $\lambda$, may be obtained.

The above point will be described together with the operation of the example embodiment.

First, in Step S11, the correspondence point detection unit 1 receives two images obtained by capturing the same plane from different angles as the data 1 and the data 2, respectively. Next, image feature points are detected by using SIFT or the like, feature amount matching is performed, and correspondence points are detected. In addition, more accurate correspondence points are narrowed down by using RANSAC or M-estimator.

Next, in Step S12, the quadratic surface calculation unit 2 calculates an ellipse C surrounding the correspondence points of the data 1. Finally, in Step S13, the projection transformation matrix calculation unit 3 calculates the projection transformation parameter h based on Equation (8) and outputs it.

As described above, if the projection transformation is calculated so as to satisfy the constraint condition (Equation (6)) specifying that an ellipse is maintained even after the transformation, a transformation from a convex quadrilateral to a convex quadrilateral is guaranteed. Since the projection transformation satisfying Equation (6) is reduced to the generalized eigenvalue problem as shown in Equation (8), it is possible to calculate a projection transformation parameter guaranteed to be transformed into a convex quadrilateral by solving this problem. Thus, the projection transformation parameter which guarantees a convex quadrilateral even after the transformation can be estimated. According to the present disclosure, even when one or more of the correspondence points are errors, the projection transformation parameter can be calculated with high accuracy.

The present disclosure is not limited to the above-described example embodiment, and may be suitably modified without departing from the spirit. For example, the example embodiment may also be implemented by the example embodiments shown in the modified example below.

Modified Example 1

A quadratic surface fitted to the correspondence points by the quadratic surface calculation unit 2 is not limited to an ellipse. For example, a constraint condition specifying that a hyperbola is fitted and the hyperbola is transformed into a hyperbola may be used. In this case, the inequalities of Equations (5) and (6) are reversed, and the solution of Equation (8) becomes an eigenvector corresponding to the smallest negative eigenvalue.

Modified Example 2

The method of solving Equation (7) by the projection transformation matrix calculation unit 3 is not limited to the generalized eigenvalue problem expressed by Equation (8). Equations (2) and (7) are optimization problems that minimize so-called algebraic errors. As another method of solving Equation (7), for example, a constrained nonlinear optimization problem with Equation (6) as a constraint condition may be solved by using a physically meaningful reprojection error or a Sampson error which is an approximation of the reprojection error as an objective function.

Modified Example 3

The image coordinates of the correspondence points output by the correspondence point detection unit 1 may be normalized in order to reduce errors in calculation of numeric values. That is, as is widely known as preprocessing of the DLT (Direct Linear Transform) method, a transformation in which an average of coordinate values is zero and a variance is $\sqrt{2}$ may be performed. A transformation in which a center of the ellipse inscribed in the rectangle surrounding the correspondence points is an origin and a major axis is 1 may be performed. For example, when the x-direction is the major axis, the parameters of the ellipse C are a=1, 0<c≤1, b=d=e=0, and f=−1. Then, S is a diagonal matrix having [0, 0, 0, 0, 0, 0, −4c, −4, 4] as components. Assuming that the normalized matrices of the data 1 and the data 2 are T and T', respectively, the projection transformation matrix calculation unit 3 may output a final projection transformation parameter as $T'^{-1}HT$.

Modified Example 4

The input data is not limited to images. For example, two three-dimensional point clouds or a three-dimensional mesh having projective distortion may be used. In this case, the projection transformation is a 4×4 matrix, and the required number of pairs of correspondence points is five or more. The quadratic surface to be fitted may be an ellipsoid or a hyperboloid. Since the constraint condition is expressed as a quadratic inequality similar to Equation (6), it is reduced to the generalized eigenvalue problem as in Equation (8).

Modified Example 5

The correspondence information between two data pieces is not limited to points. For example, a plurality of corresponding lines or segments may be used to calculate the projection transformation parameters. A point and a straight line may be used together. When a line is used, the quadratic surface calculation unit may calculate a midpoint of the lines in the image or a quadratic surface surrounding the entire line segment.

A program according to this example embodiment may be any program that causes a computer to execute Steps S11 to S13 shown in FIG. 2. In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

A specific hardware configuration of the projection transformation parameter estimation device 10 according to the example embodiment includes various variations and is not limited to a specific configuration. For example, the device according to the present disclosure may be implemented using software and may be configured to share various processes by using a plurality of hardware.

Figure 4:
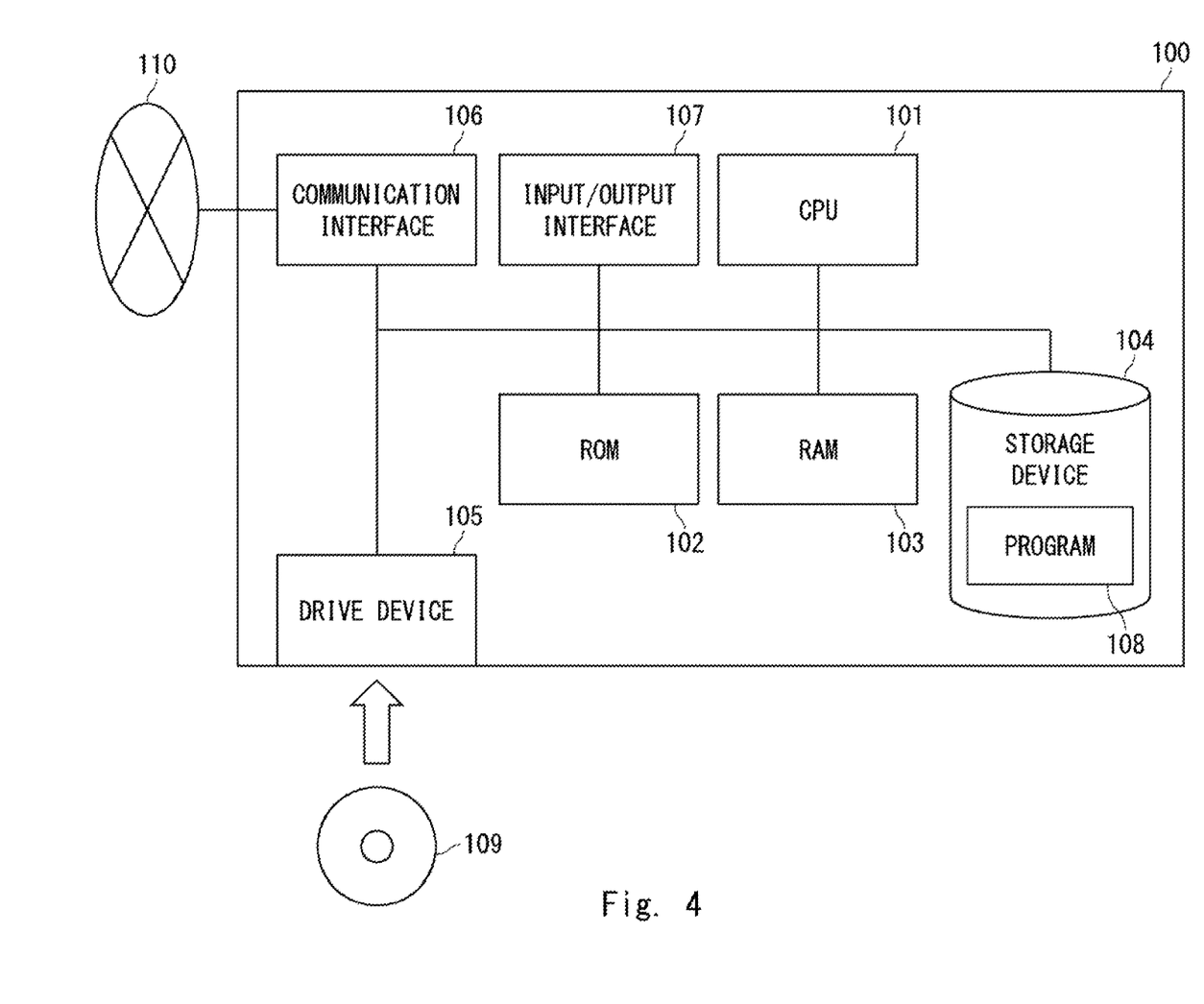
FIG. 4 is a block diagram showing an example of a hardware configuration of a computer for implementing the projection transformation parameter estimation device according to the example embodiment.

FIG. 4 is a block diagram showing an example of a hardware configuration of a computer for implementing the projection transformation parameter estimation device according to the example embodiment. A computer 100 may include a CPU (Central Processing Unit) 101, a ROM (Read Only Memory) 102, a RAM (Random Access Memory) 103, a storage device 104, a drive device 105, a communication interface 106, and an input/output interface 107. The device according to the example embodiment may be implemented by the configuration (or a part of the configuration) shown in FIG. 4.

The CPU 101 uses the RAM 103 to execute a program 108 for executing Steps S11 to S13 shown in FIG. 2. The program 108 may be stored in the ROM 102. The program 108 may be recorded on a recording medium 109 such as a memory card and read by the drive device 105, or may be transmitted from an external device via a network 110. The communication interface 106 exchanges data with an external device via the network 110. The input/output interface 107 exchanges data with peripheral equipment (input device, display device, etc.).

These components may be composed of a single circuit (such as a processor) or a combination of a plurality of circuits. The circuitry may be either a dedicated circuit or a general-purpose circuit. For example, a part of the device according to the present disclosure may be implemented by the dedicated processor and other parts of the device according to the present disclosure may be implemented by the general-purpose processor.

REFERENCE SIGNS LIST

1 CORRESPONDENCE POINT DETECTION UNIT
2 QUADRATIC SURFACE CALCULATION UNIT
3 PROJECTION TRANSFORMATION MATRIX CALCULATION UNIT
10 PROJECTION TRANSFORMATION PARAMETER ESTIMATION DEVICE
100 COMPUTER
101 CPU
102 ROM
103 RAM
104 STORAGE DEVICE
105 DRIVE DEVICE
106 COMMUNICATION INTERFACE
107 INPUT/OUTPUT INTERFACE

What is claimed is:

1. A projection transformation parameter estimation device comprising:
at least one memory storing instructions; and
at least one processor configured to execute the instructions to:
detect information about a correspondence between two pieces of input data;
fit a quadratic surface to the information about the correspondence for one or both of the two pieces of the input data; and
calculate a projection transformation parameter between the two pieces of the input data by using the information about the correspondence with a constraint condition specifying that a property of the quadratic surface is maintained even after projection transformation.

2. The projection transformation parameter estimation device according to claim 1, wherein
the two pieces of the input data are two images,
at least one processor is further configured to execute the instructions to:
detect a total of four or more pairs of either one or both of correspondence points and correspondence lines represented by two-dimensional coordinates in the image, and
calculate a conic curve.

3. The projection transformation parameter estimation device according to claim 2, wherein
at least one processor is further configured to execute the instructions to calculate an ellipse or a hyperbola as the conic curve.

4. The projection transformation parameter estimation device according to claim 1, wherein
the two pieces of the input data are three-dimensional data which is three-dimensional point cloud data or mesh data,
at least one processor is further configured to execute the instructions to:
detect a total of five or more pairs of either one or both of the correspondence points and the correspondence lines represented by three-dimensional coordinates of the three-dimensional data, and
calculate the quadratic surface.

5. The projection transformation parameter estimation device according to claim 4, wherein
at least one processor is further configured to execute the instructions to calculate an ellipsoid or a hyperboloid as the quadratic surface.

6. The projection transformation parameter estimation device according to claim 1, wherein
at least one processor is further configured to execute the instructions to:
normalize coordinate values of the correspondence points or the correspondence lines so as to reduce numerical calculation errors, and perform inverse normalization on the projection transformation parameter and then outputs the projection transformation parameter.

7. The projection transformation parameter estimation device according to claim 1, wherein
at least one processor is further configured to execute the instructions to calculate the projection transformation parameter that satisfies the constraint condition by using a generalized eigenvalue problem or a constrained nonlinear optimization.

8. A projection transformation parameter estimation method comprising:
detecting information about a correspondence between two pieces of input data;
fitting a quadratic surface to the information about the correspondence for one or both of the two pieces of the input data; and
calculating a projection transformation parameter between the two pieces of the input data by using the information about the correspondence with a constraint condition specifying that a property of the quadratic surface is maintained even after projection transformation.

9. A computer readable medium storing a program for causing a computer to execute processing of:
detecting information about a correspondence between two pieces of input data;
fitting a quadratic surface to the information about the correspondence for one or both of the two pieces of the input data; and
calculating a projection transformation parameter between the two pieces of the input data by using the information about the correspondence with a constraint condition specifying that a property of the quadratic surface is maintained even after projection transformation.

* * * * *